United States Patent [19]
Collins

[11] Patent Number: 5,563,492

[45] Date of Patent: Oct. 8, 1996

[54] VEHICULAR BATTERY CHARGING SWITCH

[76] Inventor: Robert J. Collins, 20 W. 3rd St., Havre, Mont. 59501

[21] Appl. No.: 285,113

[22] Filed: Aug. 3, 1994

[51] Int. Cl.⁶ .............................. H02J 7/14; H01H 1/24; H01H 29/02
[52] U.S. Cl. .............................. 320/2; 200/236; 200/293; 200/301
[58] Field of Search ............................ 320/2; 200/215, 200/236, 293, 301

[56] References Cited

U.S. PATENT DOCUMENTS

| | | | |
|---|---|---|---|
| 3,846,748 | 11/1974 | Hopwood | 200/61.45 |
| 4,006,452 | 2/1977 | Garcino | 200/61.52 |
| 4,163,127 | 7/1979 | Herou | 200/61.47 |
| 4,275,378 | 6/1981 | Henderson | 200/61.45 |
| 4,351,405 | 9/1982 | Fields et al. | 180/65 |
| 4,615,180 | 10/1986 | Rudman | 200/61.45 |
| 5,143,208 | 9/1992 | Shostek et al. | 200/187 |
| 5,175,402 | 12/1992 | Olson | 200/84 |
| 5,477,428 | 12/1995 | Brown et al. | 362/80 |

FOREIGN PATENT DOCUMENTS 2476558  8/1981  France .............................. B60L 3/00

Primary Examiner—Peter S. Wong
Assistant Examiner—K. Shin

[57] ABSTRACT

A vehicular battery charging switch comprising a tubular vial having a front end, a rear end, and a small amount of electrically conductive liquid material disposed therein; a coupling mechanism for coupling the vial to a vehicle such that its front end is positioned below its rear end when the vehicle is positioned on a level grade; and a pair of electrical contact pins coupled to and extended within the front end of the vial with one contact pin adapted to be connected to an alternator and the other contact pin adapted to be connected to a voltage regulator that is associated with a battery; whereby when a vehicle is travelling on level-grades and on down-grades, the front end of the vial is held below the rear end thereof such that the conductive liquid material is placed in contact with the contact pins, thereby connecting the alternator with the voltage regulator and allowing charging of the associated battery, and when a vehicle is travelling on up-grades, the front end of the vial is tilted above the rear end thereof such that the conductive liquid material breaks contact with the contact pins, thereby disconnecting the alternator from the voltage regulator and preventing charging of the associated battery.

1 Claim, 4 Drawing Sheets

VEHICULAR BATTERY CHARGING SWITCH

BACKGROUND OF THE INVENTION

1. Field of the Invention

The present invention relates to a vehicular battery charging switch and more particularly pertains to electrically connecting an alternator with a battery of a vehicle for charging when held downwards or held level and disconnecting an alternator with a battery of an alternator when tilted upwards with a vehicular battery charging switch.

2. Description of the Prior Art

The use of electrical level switches is known in the prior art. More specifically, electrical level switches heretofore devised and utilized for the purpose of activating and deactivating an electrical connection when positioned accordingly are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,978,301 to Bitko discloses a mercury tilt switch. U.S. Pat. No. 4,099,040 to Bitko discloses a mercury type tilt switch. U.S. Pat. No. 4,797,519 to Elenbaas discloses a mercury tilt switch and method of manufacture. U.S. Pat. No. 5,143,208 to Shostek et al. discloses a level sensor. U.S. Pat. No. 5,175,402 to Olson discloses a mercury float switch.

While these devices fulfill their respective, particular objective and requirements, the aforementioned patents do not describe a vehicular battery charging switch that activates or deactivates a circuit between an alternator and battery based on the orientation of a vehicle.

In this respect, the vehicular battery charging switch according to the present invention substantially departs from the conventional concepts and designs of the prior art, and in doing so provides an apparatus primarily developed for the purpose of electrically connecting an alternator with a battery of a vehicle for charging when held downwards or held level and disconnecting an alternator with a battery of an alternator when tilted upwards.

Therefore, it can be appreciated that there exists a continuing need for new and improved vehicular battery charging switch which can be used for electrically connecting an alternator with a battery of a vehicle for charging when held downwards or held level and disconnecting an alternator with a battery of an alternator when tilted upwards. In this regard, the present invention substantially fulfills this need.

SUMMARY OF THE INVENTION

In the view of the foregoing disadvantages inherent in the known types of electrical level switches now present in the prior art, the present invention provides an improved vehicular battery charging switch. As such, the general purpose of the present invention, which will be described subsequently in greater detail, is to provide a new and improved vehicular battery charging switch and method which has all the advantages of the prior art and none of the disadvantages.

To attain this, the present invention essentially comprises, in combination, a container having a generally rectangular mounting plate with a central axis, a top edge, a bottom edge, and opposed front and rear edges with the rear edge having a coupling hole adjacent thereto and a front edge having a slot adjacent thereto, the container further having a hollow and generally box-shaped cover with a downwardly extended cut out formed thereon removably coupled to the base plate through a pair of laterally extended lips, thereby creating a compartment between the cover and the mounting plate. Coupling means are included and disposed through the coupling hole and adjustably disposed through the slot of the base plate for coupling the container to a side wall of an engine compartment of a vehicle such that the central axis of the mounting plate is positioned near a level orientation when the vehicle is positioned on a level-grade, the front edge is facing a front end of the vehicle, and the rear end is facing the rear end of the vehicle with the coupling means further adapted to simultaneously damp vibrational motion from the vehicle directed towards the container. A base plate is coupled to the mounting plate within the compartment of the container. A tubular vial is included and has a centroid, a front end facing the front edge of the mounting plate, a rear end facing the rear edge of the mounting plate, and a small amount of electrically conductive liquid mercury disposed therein, the vial coupled to the base plate such that its front end is positioned below its rear end with respect to an axis disposed through its centroid and positioned in parallel with the central axis of the container. A pair of electrical contact pins is coupled to and extended within the front end of the vial. An electrical connector plug is included and has a housing and a pair of terminals extended therethrough with each terminal having an upper end and a lower end with the lower end of one terminal adapted to be coupled to an alternator and the lower end of the other terminal adapted to be connected to voltage regulator that is associated with a battery. Lastly, a pair of wires is included with each wire having one end coupled to a separate contact pin on the vial and an opposite end coupled to a separate upper end of a terminal of the electrical connector plug. When a vehicle is travelling on level-grades and on down-grades, the front end of the vial is held below the rear end thereof such that the liquid mercury is placed in contact with the contact pins, thereby connecting the alternator with the voltage regulator and allowing charging of the associated battery. When a vehicle is travelling on up-grades, the front end of the vial is tilted above the rear end thereof such that the liquid mercury breaks contact with the contact pins, thereby disconnecting the alternator from the voltage regulator and preventing charging of the associated battery.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular battery charging switch which has all the advantages of the prior art electrical level switches and none of the disadvantages.

It is another object of the present invention to provide a new and improved vehicular battery charging switch which may be easily and efficiently manufactured and marketed.

It is a further object of the present invention to provide a new and improved vehicular battery charging switch which is of durable and reliable construction.

An even further object of the present invention is to provide a new and improved vehicular battery charging switch which is susceptible of a low cost of manufacture with regard to both materials and labor, and which accordingly is then susceptible of low prices of sale to the consuming public, thereby making such a vehicular battery charging switch economically available to the buying public.

Still yet another object of the present invention is to provide a new and improved vehicular battery charging switch which provides in the apparatuses and methods of the prior art some of the advantages thereof, while simultaneously overcoming some of the disadvantages normally associated therewith.

Even still another object of the present invention is to provide a new and improved vehicular battery charging switch for electrically connecting an alternator with a battery of a vehicle for charging when held downwards or held level and disconnecting an alternator with a battery of an alternator when tilted upwards.

Lastly, it is an object of the present invention to provide a new and improved vehicular battery charging switch comprising a tubular vial having a front end, a rear end, and a small amount of electrically conductive liquid material disposed therein; coupling means for coupling the vial to a vehicle such that its front end is positioned below its rear end when the vehicle is positioned on a level grade; and a pair of electrical contact pins coupled to and extended within the front end of the vial with one contact pin adapted to be connected to an alternator and the other contact pin adapted to be connected to a voltage regulator that is associated with a battery; whereby when a vehicle is travelling on level-grades and on down-grades, the front end of the vial is held below the rear end thereof such that the conductive liquid material is placed in contact with the contact pins, thereby connecting the alternator with the voltage regulator and allowing charging of the associated battery, and when a vehicle is travelling on up-grades, the front end of the vial is tilted above the rear end thereof such that the conductive liquid material breaks contact with the contact pins, thereby disconnecting the alternator from the voltage regulator and preventing charging of the associated battery.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
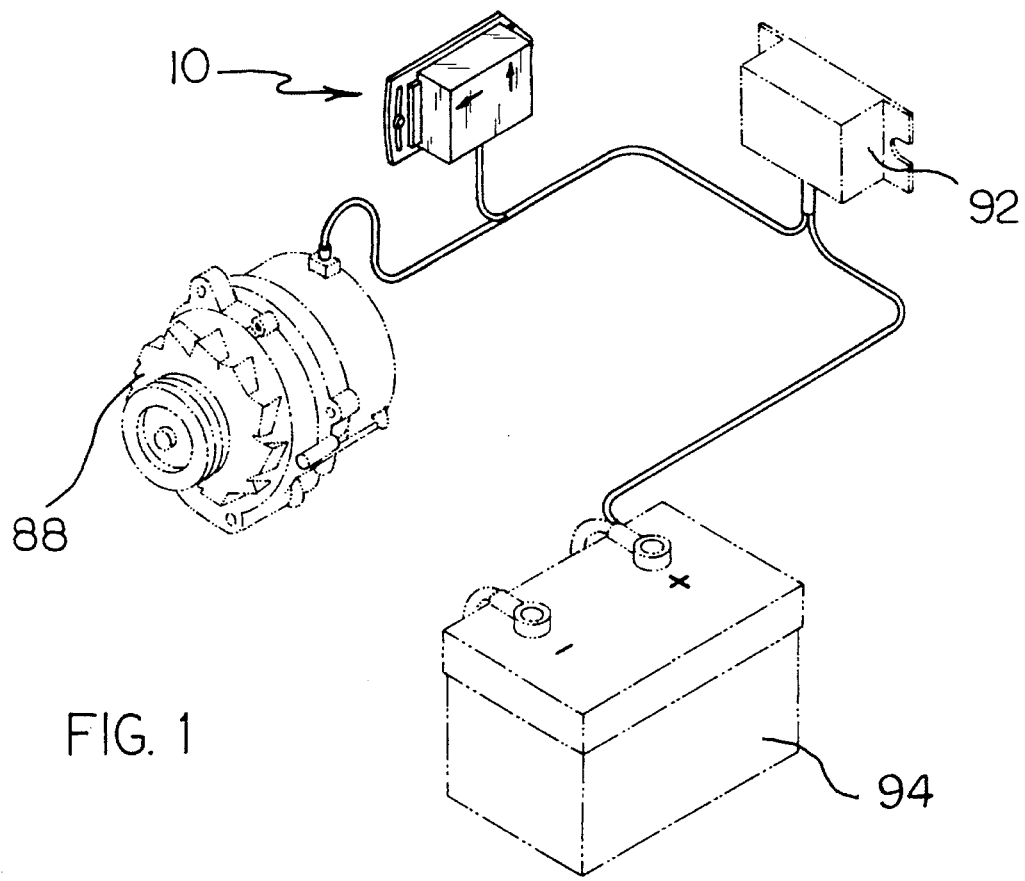
FIG. 1 is a perspective view of the preferred embodiment constructed in accordance with the principles of the present invention coupled between an alternator and a voltage regulator of a vehicle for allowing the charging of an associated battery.
Figure 2:
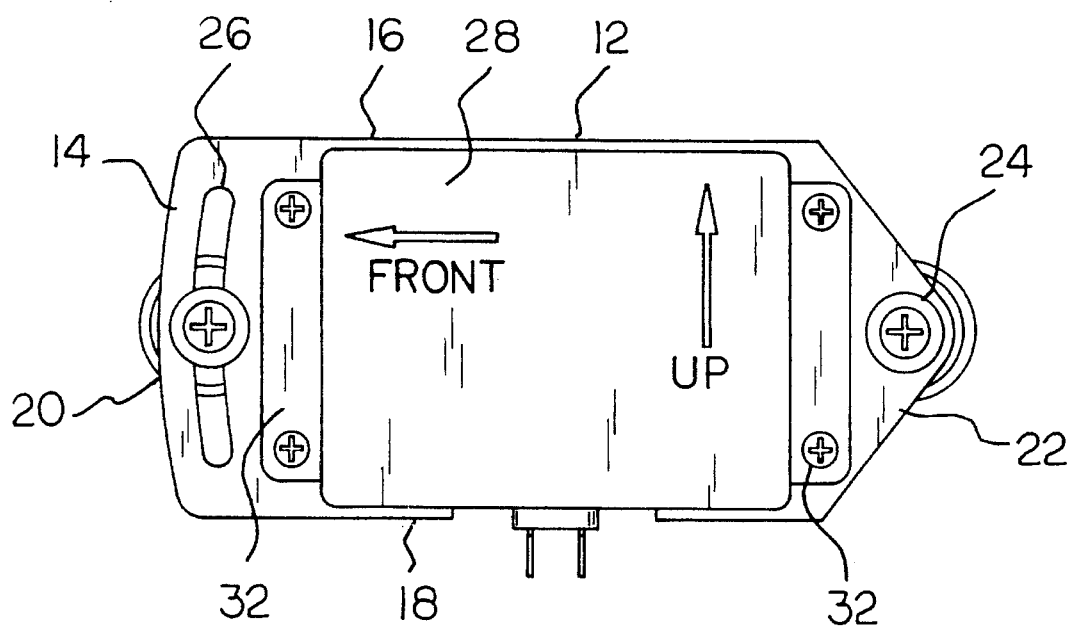
FIG. 2 is a side elevational view of the container of the present invention that is to be adjustably secured to a side wall within an engine compartment of a vehicle.
Figure 3:
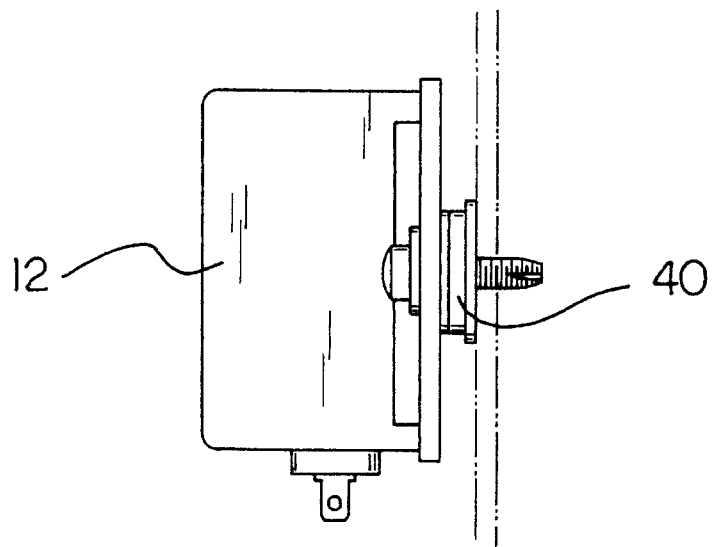
FIG. 3 is a side elevational view of the container and its coupling with the wall of the engine compartment of a vehicle.
Figure 4:
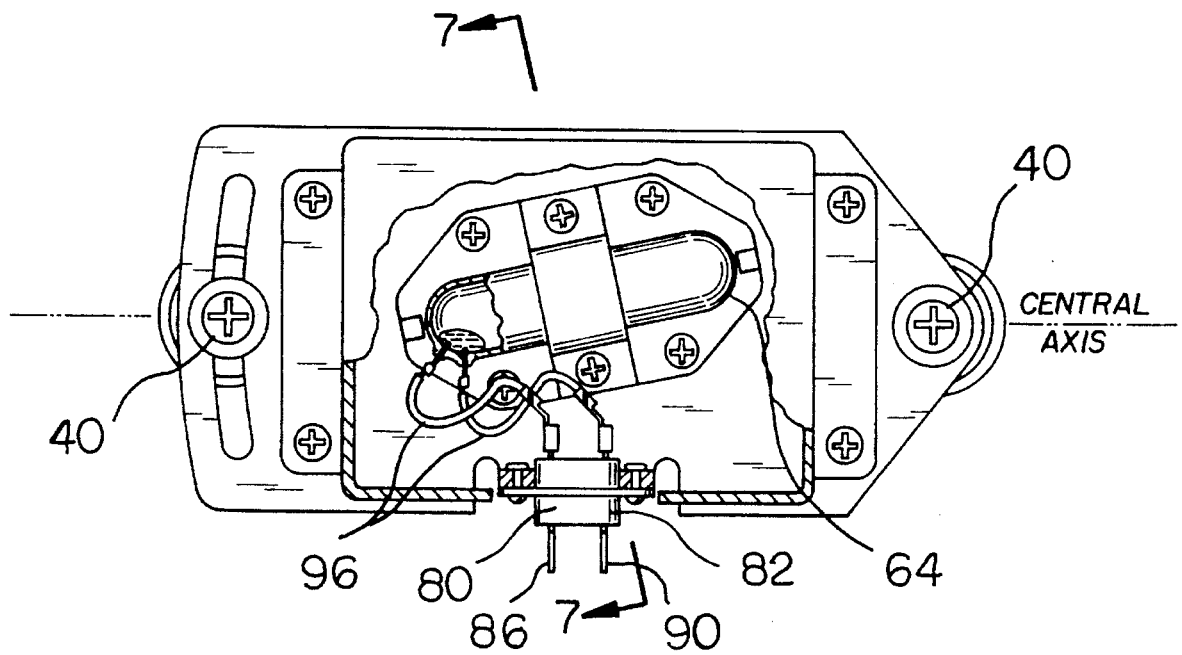
FIG. 4 is a side elevational view of the present invention with a portion of the cover removed for depicting the vial and associated base plate when the container is held in an essentially level orientation, in this orientation the switch is activated, thereby connecting the alternator to the voltage regulator and associated battery. The switch is also activated when the container is held downwards with respect to its front portion.
Figure 5:
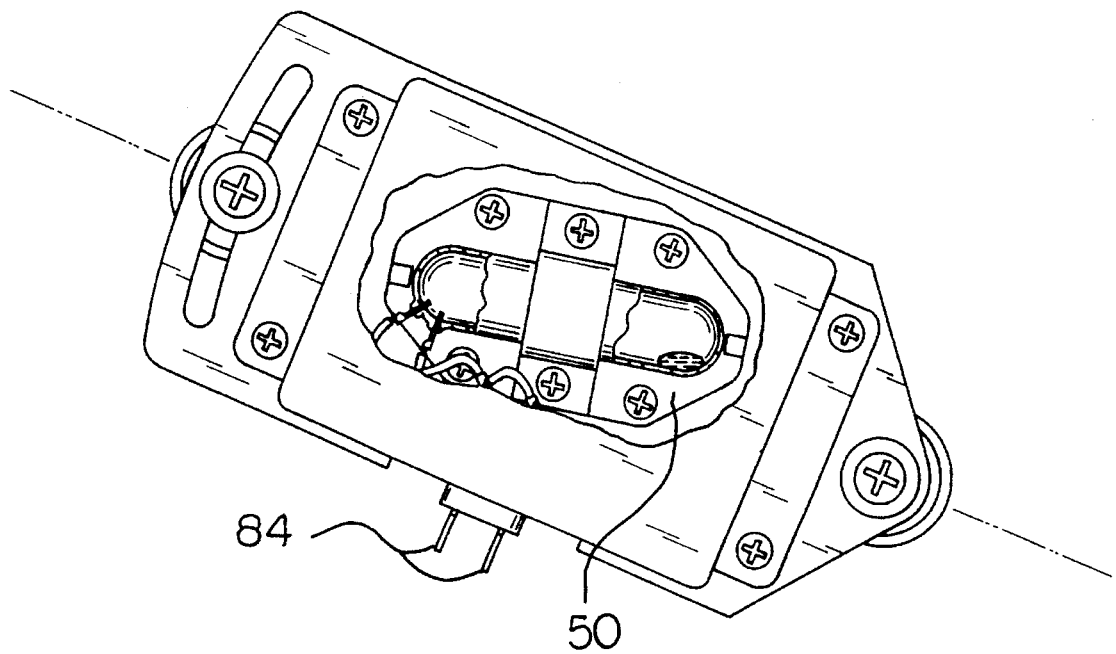
FIG. 5 is a side elevational view of the present invention with a portion of the container removed for depicting the vial and associated base plate. When the front container is tilted upwards with respect to the front portion thereof, the vial is tilted such that the circuit between the alternator and voltage regulator is disconnected.
Figure 6:
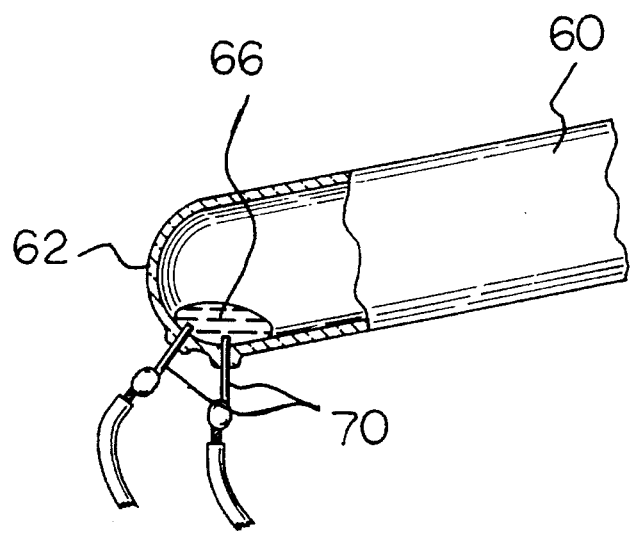
FIG. 6 is an enlarged side elevational view with a portion of the vial removed for depicting the electrically active connection between the conductive liquid in the vial and the contacts which forms a terminal connection between the alternator and voltage regulator.
Figure 7:
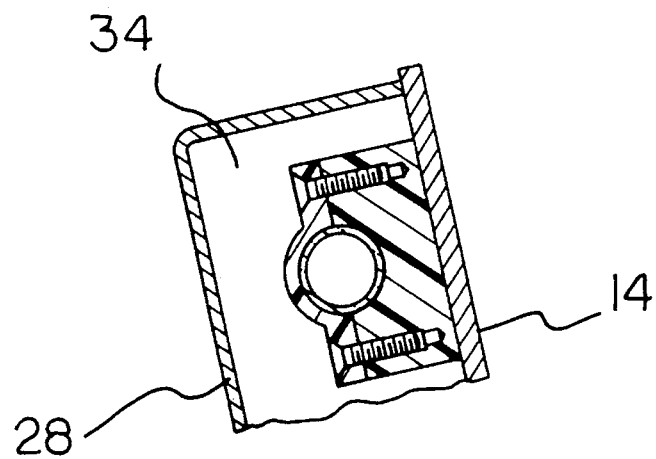
FIG. 7 is a cross-sectional view of the coupling between the vial, base plate, and mounting plate taken along the line 7—7 of FIG. 4.
Figure 8:
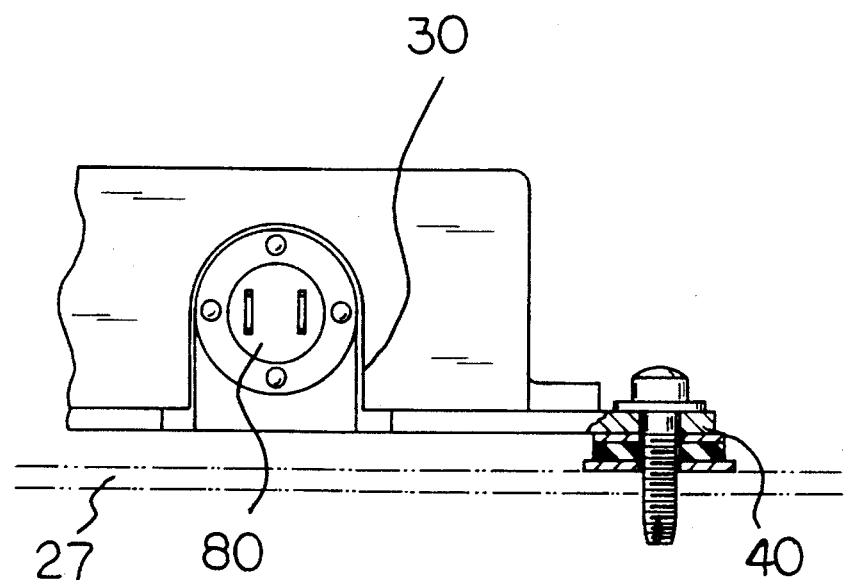
FIG. 8 is a side elevational view of the bottom portion of the container depicting the two prong connector plug used to make an electrical connection between the alternator and voltage regulator. This Figure also depicts the connection of the base plate of the switch to the wall of the engine compartment of a vehicle.

With reference now to the drawings, and in particular, to FIG. 1 thereof, the preferred embodiment of the new and improved vehicular battery charging switch embodying the principles and concepts of the present invention and generally designated by the reference number 10 will be described.

Specifically, the present invention includes seven major components. The major components are container, coupling means, base plate, vial, contact pins, connector plug, and wires. These components are interrelated to provide the intended function.

More specifically, it will be noted in the various Figures that the first major component is the container 12. The container is rigid in structure and formed of a plastic material. It has a generally rectangular mounting plate 14 having a central axis, a top edge 16, a bottom edge 18 and opposed front and rear edges 20, 22. The rear edge of the container has a coupling hole 24 formed adjacent thereto. The front edge of the container has a slot 26 formed adjacent thereto. The coupling slot and hole are used for securing the mounting plate to a side wall 27 of a vehicle. The container further includes a hollow and generally boxed-shaped cover. The box shaped cover has a downwardly extended and generally u-shaped cut out 30 formed thereon. The cut out is positioned adjacent to the opening of the cover. The cover is removably coupled to the mounting plate through a pair of laterally extended lips 32. These lips are secured to the cover with screws. This coupling creates a compartment 34 located between the cover and mounting plate. The cover also has indica disposed thereon for indicating to a user how the switch should be positioned. An arrow indicating the upward position for the present invention is disposed on the cover. An arrow indicating the frontal position for the present invention is also disposed on the cover.

The second major component is the coupling means 40. The coupling means is disposed in the coupling hole 24 and adjustably disposed through the slot 26 of the mounting plate of the container. The coupling means is used for coupling the container to a side wall 27 of an engine compartment of a vehicle. This coupling is performed such that the central axis of the mounting plate is positioned near a level orientation when the vehicle is positioned on a level-grade. In the preferred embodiment, the coupling means consists of two threaded bolts. The first bolt is disposed through the coupling hole and tightened relatively firm but still allowing the mounting plate to rotate. Thus, it defines a pivot point for the mounting plate. The second bolt is then disposed in the slot and tightened relatively firm but still allowing the front portion of the mounting plate to move upwards or downwards. The mounting plate is then adjusted in a level orientation. The screws are then firmly tightened down to the side walls, thus securing the mounting plate in a rigid configuration. The coupling means is secured such that the front edge of the mounting plate 20 is facing the front end of a vehicle and the rear end 22 of the mounting plate is facing the rear end of the vehicle. The coupling means also is adapted to simultaneously damp vibrational motion from the vehicle directed towards the container 12. The vibrational dampening is reduced by the use of a flexible shock absorbing washer formed of an elastomeric matrix disposed between two rigid washers and then mated with each bolt before each bolt is threadably coupled to the side wall. When coupled to a sidewall in this fashion, the flexible washer absorbs shocks and vibrations directed towards the container.

The third major component is the base plate 50. The base plate is rigid and elongated in structure and has eight sides. The base plate is coupled to the mounting plate 14 within the compartment of the container. It is secured to the mounting plate with screws.

The fourth major component is the vial 60. The vial is tubular and formed of glass or a other rigid material. The vial has a centroid, a sealed front end 62 facing the front edge 20 of the mounting plate, a rear sealed end 64 facing the rear edge 22 of the mounting plate. A small amount of electrically conductive liquid mercury 66 is disposed within the vial. The vial is then coupled to the base plate 50 with a generally u-shaped bracket. It is positioned upon the base plate such that its front end is positioned below its rear end with respect to an axis disposed through its centroid and with this axis further positioned in parallel with the central axis of the mounting plate of the container.

The fifth major component is the contact pins 70. The present invention includes a pair of rigid electrical contact pins. The contact pins are formed of electrically-conductive metal. They are coupled to and extended with the front end 62 of the vial and terminated at location within the interior of the container. A condenser may be coupled across the contacts pins to reduce possible arcing therebetween when they are positioned in electrical contact with the liquid mercury in the vial.

The sixth major component is the electrical connector plug 80. The electrical connector plug has a housing 82 and a pair of metal terminals 84 extended therethrough. Each terminal has an upper end and a lower end. The lower ends of the terminals define a prong. The lower end 86 of one terminal is adapted to be coupled to an alternator 88. The lower end 90 of the other terminal is adapted to be coupled to a voltage regulator 92 that is associated with a battery 94. The battery in combination with the present invention, voltage regulator and alternator defines a circuit for transferring current to the alternator field winding. The electrical connector plug is coupled to the mounting plate and extends through the cut out of the cover. In this configuration, a separate external plug may be coupled and decoupled from the connector plug with the covered secured over the vial.

The seventh major component is the pair of electrically-conductive wires 96. One end of each wire is coupled to a separate contact Din 70 on the vial. The opposite end of each wire is coupled to a separate upper end of a terminal of the electrical connector plug. In this fashion, the pair of wires completes the circuit between the alternator, vial, and voltage regulator associated with a battery.

When a vehicle is traveling on level-grades and on down-grades, the front end of the vial is held below the rear end of the vial. In this orientation, the liquid mercury is placed in contact with the contact pins. The alternator is thus electrically connected with the voltage regulator, thereby allowing charging of the associated battery. When a vehicle is traveling on up-grades, the front end of the vial is tilted above the rear end of the vial. In this orientation, the liquid mercury flows from the front end of the vial towards the rear end of the vial and breaks contact with the contact pins. The alternator is thus disconnected from the voltage regulator, thereby preventing charging from the associated battery.

When the present invention is installed in the electrical charging circuit of a truck or other vehicle, it will save the owner money on each and every trip. When the truck or other vehicle travels on a level-grade or on a down-grade, the alternator will turn and charge a battery as normal when requested by the voltage regulator. It will turn hard when charging, and turn easily when not charging. When the truck or other vehicle travels on an up-grade, the mercury switch will open the circuit to the alternator, and the alternator will not charge at all. The alternator now turns easily since it is not charging, which lets the engine develop more useable power with the same amount of fuel used on the up-grade. On the down-grade the voltage regulator will once again be enabled, thereby allowing the alternator to supply electricity for recharging the battery which was previously discharged on the up-grade. Furthermore, the alternator will turn harder on the down-grade. This allows the engine act as a brake. In this manner a driver utilizes the brakes less on the down-grade, which lessens wear on the brakes, thereby saving money on brake replacement.

Additionally, a first bypass circuit could be provided and coupled across the present invention so that the alternator of the vehicle could charge when the transmission was in nuetral. Another addition would involve the installation of a second bypass circuit. The second bypass circuit would be coupled across the present invention. It would include an activation switch mounted on the instrument panel of a vehicle. The activation switch of the second bypass circuit would allow an operator to bypass the present invention if there existed a need for the alternator to supply current.

To summarize, on the up-grade, the alternator does not charge, and the engine will use less fuel. On the down-grade the alternator must charge heavier because the regulator will replace the energy drawn from the battery on the up-grade. When the alternator turns harder on the down-grade then the engine will be able to act more as a brake, which will save wear on the brakes. The present invention is also adaptable for use on all airplanes, especially when the extra power is needed for climbing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicular battery charging switch for electrically connecting an alternator with a battery of a vehicle for charging comprising, in combination:

a plastic container having a generally rectangular mounting plate with a central axis, a top edge, a bottom edge, and opposed front and rear edges with the rear edge having a coupling hole adjacent thereto and a front edge having a slot adjacent thereto, the container further having a hollow and generally box-shaped cover with a downwardly extended U-shaped cut out formed thereon removably coupled to the mounting plate through a pair of laterally extended lips, thereby creating a compartment between the cover and the mounting plate;

coupling means comprising a first threaded screw disposed through the coupling hole and a second threaded screw adjustably disposed through the slot of the mounting plate for coupling the container to a side wall of an engine compartment of a vehicle such that the central axis of the mounting plate is positioned near a level orientation when the vehicle is positioned on a level-grade, the front edge is facing a front end of the vehicle, and the rear end is facing the rear end of the vehicle, wherein the screws may first be tightened relatively firm but still allowing the mounting plate to rotate so that the mounting plate may be adjusted and later firmly tightened, the coupling means further comprising a flexible shock absorbing washer formed of elastomeric material disposed between two rigid washers and then mated with each screw prior to the screws being threadedly coupled to the side wall thereby simultaneously damping vibrational motion from the vehicle directed towards the container and securing the mounting plate to the side wall;

a base plate coupled via set of screws other than the first and second screws to the mounting plate within the compartment of the container;

a tubular vial having a centroid, a front end facing the front edge of the mounting plate, a rear end facing the rear edge of the mounting plate, and a small amount of electrically conductive liquid mercury disposed therein, the vial coupled to the base plate with a U-shaped bracket such that its front end is positioned below its rear end with respect to an axis disposed through its centroid and positioned in parallel with the central axis of the container;

a pair of electrical contact pins coupled to and extended within the front end of the vial;

an electrical connector plug having a housing disposed in the cut out of the cover and a pair of terminals extended therethrough with each terminal having an upper end and a lower end thus defining a prong, the lower end of one terminal adapted to be coupled to an alternator and the lower end of the other terminal adapted to be connected to voltage regulator that is associated with a battery; and a pair of wires with each wire having one end coupled to a separate contact pin on the vial and an opposite end coupled to a separate upper end of a terminal of the electrical connector plug;

whereby when a vehicle is travelling on level-grades and on down-grades, the front end of the vial is held below the rear end thereof such that the liquid mercury is placed in contact with the contact pins, thereby connecting the alternator with the voltage regulator and allowing charging of the associated battery, and when a vehicle is travelling on up-grades, the front end of the vial is tilted above the rear end thereof such that the liquid mercury breaks contact with the contact pins, thereby disconnecting the alternator from the voltage regulator and preventing charging of the associated battery.

\* \* \* \* \*